Dec. 2, 1952 S. D. VIGREN ET AL 2,620,401
AUTOMATIC TELEPHONE SYSTEM
Filed July 10, 1947
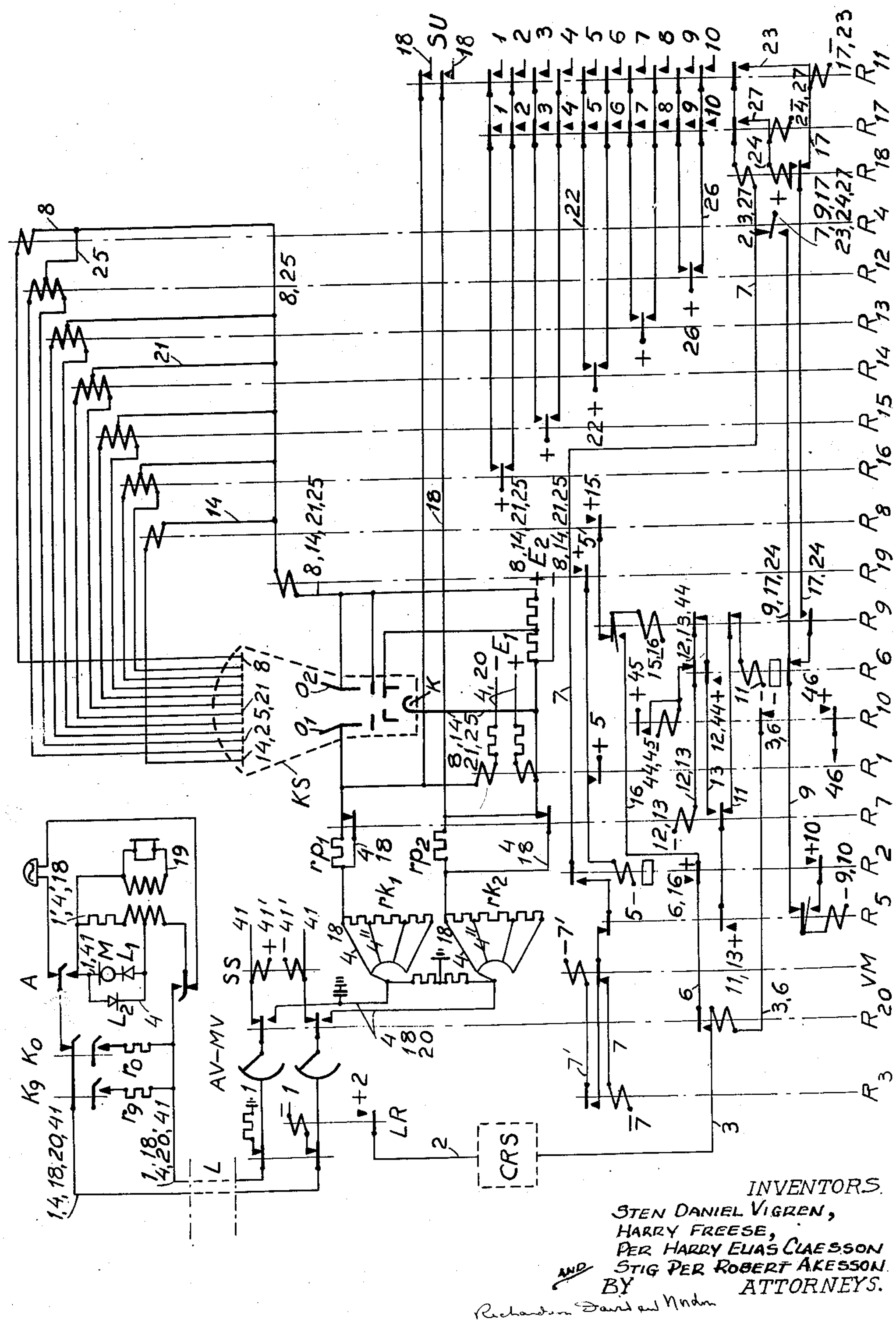
INVENTORS.
STEN DANIEL VIGREN,
HARRY FREESE,
PER HARRY ELIAS CLAESSON
AND STIG PER ROBERT AKESSON
BY ATTORNEYS.
Richardson David and Nordon Patented Dec. 2, 1952

2,620,401

UNITED STATES PATENT OFFICE 2,620,401

AUTOMATIC TELEPHONE SYSTEM

Sten Daniel Vigren, Harry Freese, Per Harry Elias Claesson, and Stig Per Robert Åkesson, Stockholm, Sweden Application July 10, 1947, Serial No. 760,058
In Sweden April 4, 1945

Section 1, Public Law 690, August 8, 1946
Patent expires April 4, 1965

11 Claims. (Cl. 179—18)

The present invention pertains to apparatus for initiating calls in machine switching telephone systems, and more particularly to apparatus of this type which is adapted to take full advantage of modern high speed machine switching apparatus such as crossbar switches, for example.

It is among the objects of the invention to eliminate the inherent time delay which of necessity accompanies the use of the usual impulse dial in transmitting the desired information regarding the number of the called subscriber to the switching mechanism at the central office.

It is a further object of the invention to provide means at each subscriber's station which is substantially instantaneous in its operation, and which is therefore capable of cooperation without unnecessary delay with high speed switching apparatus such as crossbar switches.

A further object of the invention is to provide a system of this character which is capable of rapidly receiving the information transmitted by the calling subscriber and transmitting this information to machine switching apparatus for effecting the desired connection with a minimum of delay.

Still another object of the invention is to provide a system of this character in which each subscriber's station is provided with a plurality of standard resistors which may be selectively connected across the subscriber's loop by means of non-locking push buttons, each of the standard resistors having an arbitrary resistance value identifying a digit forming a part of the number of a called subscriber.

Another object of the invention resides in the provision of apparatus at the central office which will equalize the loop resistance of any calling subscriber to a standard fixed predetermined value prior to the initiation of any call. This enables the central office apparatus to identify and to respond correctly to the selective bridging of the several standard resistors successively across the subscriber's loop, notwithstanding resistance variations among the different subscriber's loops, or variations in loop resistance of any particular loop, such as those occasioned by changes in temperature.

A feature of the invention resides in the provision of apparatus at the central office which first makes a loop resistance test, equalizing the loop resistance to the fixed predetermined standard value, and thereafter, connects a potential or resistance responsive device to the loop, substantially simultaneously subjecting the potential responsive device to preliminary potential tests for two values immediately outside the limits of the values which will be encountered by connection of the maximum and minimum standard resistors at the subscriber's station. In the event that the preliminary potential test should indicate an unsatisfactory result, an alarm is given indicating a trouble condition. If the preliminary test gives a satisfactory result, dial tone is sent out to the calling subscriber, who thereupon consecutively presses individual buttons to connect certain of the several standard resistors across his loop in the succession corresponding to the code or digits of the number of the desired called subscriber.

Other and further objects will become apparent upon reading the following specification together with the accompanying drawing forming a part hereof.

Referring to the drawing, the single figure is a schematic circuit diagram of an embodiment of the invention.

Referring to the drawing, the embodiment of the invention illustrated comprises a plurality of similar subscriber's stations, only one of which is shown, each having a receiver 19 and a transmitter M. The transmitter M is either connected in series with a rectifier $L_1$ or is shunted by a rectifier $L_2$, or both, to separate the control currents from the usual talking currents, and to eliminate from the control circuit, the possible effects of resistance variation in the transmitter M. The usual switch-hook contacts are designated A.

Each subscriber station comprises a group of ten non-locking push buttons designated $K_0$ to $K_9$, the intermediate buttons having been omitted from the drawing for simplicity of illustration. Operation of any of these buttons closes its associated normally open contacts and also opens a common normally closed contact shown directly above the button $K_0$. Operation of any one of these buttons bridges an associated standard resistor $r_0$ to $r_9$ directly across a telephone line L which extends from the subscriber's apparatus to the telephone central office. Each of the ten resistors $r_0$ to $r_9$ has a distinctive resistance value which identifies the particular one of the ten buttons $K_0$ to $K_9$ which has been pressed.

At the central office, each line is provided with a line relay LR having contacts which extend to a marker, or lockout circuit CRS which causes line finder equipment comprising the selector switch apparatus AV—MV to find the line of the calling subscriber and connect the same through the contacts of a relay $R_{20}$ with the calling subscriber's line. The specific line finder and marker circuits are not shown, since these are conventional in all respects and any desired form may be used. The terminal banks of the selector AV—MV are illustrated diagrammatically as arcs, but in a telephone system will comprise a plurality of terminals, each connected to an individual subscriber's line.

Relay $R_{20}$ connects the line of the calling subscriber to a selector switch VM whose contacts are adapted to connect so much of resistors $rk_1$ and $rk_2$ in series with the calling subscriber's line as may be required to equalize the loop resistance to a predetermined fixed value, as hereinafter described.

The potential responsive, or resistance responsive apparatus at the central office comprises an electron beam, or cathode ray switching device KS which is shown comprising twelve targets each adapted for individual completion of a circuit established by deflecting the electron beam. The electronic switching device KS comprises an electron gun having a cathode $k$ and deflecting plates $a_1$ and $a_2$. Application of the correct potential to the deflecting plates $a_1$ and $a_2$ will cause the electron beam to reach any desired one of the twelve targets.

The ten intermediate targets are individually selectable by bridging the subscriber's line L with one of the corresponding standard resistors $r_0$ to $r_9$, the loop resistance having first been equalized to a predetermined fixed value as hereinafter described.

The polarized relays $R_{12}$ to $R_{16}$ are individually responsive to the ten intermediate targets, two targets being associated with each of these relays, and the contacts of each such relay being operated either upwardly or downwardly depending upon which of the two targets is energized by the electron beam of the device KS.

Associated with the contacts of the relays $R_{17}$ and $R_{11}$ at the right of the drawing are impulse storing relays, or similar apparatus of known type, not shown, by which the successive digits of the called number are recorded prior to the operation of the machine switching apparatus for completion of the call. Since the present invention is concerned with the digit selecting apparatus at the subscriber's station and at the central office, rather than with the particular machine switching apparatus into which these selected digits are transmitted, the machine switching apparatus is not shown or described and may take any desired conventional form.

Suppose, for example, that a certain subscriber whose telephone apparatus is shown at the top of the drawing, wishes to call another subscriber whose number is 41 by lifting the telephone and by pushing down the push buttons $K_4$ and $K_1$ in this order. When the telephone is lifted, the contacts of the switch hook A are operated, whereby the microphone M and the rectifier $L_1$ or $L_2$ or both are connected to circuit 1 and a resistor $r_4$ connected in parallel to establish M and L, is connected with the circuit 1—1'—1.

The line relay LR operates and completes a circuit 2 with the common set of relays or lockout circuit CRS. The set of relays CRS consists of relays which in a known way connect a selector AV—MV with the calling subscriber. Further a circuit 3 is formed, whereby $R_{20}$ is caused to operate. When AV—MV is connected to the calling subscriber, the cut-off relay BR operates in a known manner, whereby circuit 1 is broken. LR drops and breaks circuit 2. When $R_{20}$ is operated, the circuit 4 and 4—4'—4 is formed immediately from a source of current $E_1$ which is individual for each register and insulated from earth. The circuit through the microphone is blocked by the rectifier $L_1$, or shortcircuited by the rectifier $L_2$, whereby the effects of the resistance variations of the microphone are eliminated. $R_1$ is operated and forms circuit 5 to $R_2$, which closes the holding circuit 6 in series with $R_{20}$. In the meantime circuit 3 is disconnected from CRS. $R_2$ closes the circuit 7 to $R_3$, which in its turn closes circuit 7—7' to the operating magnet of the selector switch VM. When VM is operated, circuit 7 is disconnected, whereby $R_3$ drops. In consequence thereof circuit 7—7' is disconnected, whereafter VM also drops. Thereby the selector arms are advanced one step and connect the upper parts of the resistances $rk_1$ and $rk_2$ to the respective line branches, whereby circuit 4—4'—4''—4 is formed. This current is produced from the source of voltage $E_1$, the direction of which is opposite to the voltage imposed on the deflecting plates $a_1$ and $a_2$ by the source of current $E_2$ which is individual for each resistance responsive device and is insulated from earth. Since the resistance of the circuit 4—4'—4''—4 is higher than that of the previous circuit 4—4'—4, it follows that a larger part of the voltage from $E_1$ counteracts the voltage from $E_2$ on the deflecting plates $a_1$ and $a_2$. Thereby the direction of the electronic beam or ray in the tube KS is changed. Supposing that the electronic ray during such change of voltage is already directed towards the target or collector in the tube KS situated farthest on the right, circuit 8 is formed. The relays $R_4$ and $R_{19}$ connected in series in the said circuit are operated. $R_4$ disconnects circuit 7 whereby further operation of $R_3$ and further advancement of VM are prevented and instead of this circuit 9 is formed, whereby $R_5$ is operated and is held via circuit 10. $R_5$ forms circuit 11 to $R_6$ which operates and forms circuit 12. $R_7$ operates and is held via circuit 13 and disconnects circuit 11, whereby $R_6$ drops with delayed action. When $R_7$ operates, test resistances $rp_1$ and $rp_2$ are connected in series with circuit 4'—4''—4. From $E_1$ such part of the voltage is consequently transferred onto the deflecting system $a_1$ and $a_2$ and counteracts the voltage from $E_1$ imposed on it, that the electronic ray is directed to the collector situated farthest to the left, whereby circuit 14 is formed. $R_8$ is operated in series with $R_{19}$ and forms circuit 15. $R_9$ operates and is held via circuit 16. $R_9$ disconnects circuit 13, whereby $R_7$ drops and shortcircuits the resistances $rp_1$ and $rp_2$. The voltage on the deflecting plates $a_1$ and $a_2$ is restored thereby and circuit 8 is formed again. $R_4$ operates again. After a short moment $R_6$ drops, as mentioned before, whereby circuit 17 is formed. Thereby circuit 18 is initially completed, whereby a buzzing or dial tone is sent to the subscriber's telephone apparatus. Buzzer tone current is transferred to the telephone receiver in circuit 19 as a signal that the sending of impulses can start.

The subscriber pushes down push buttons 4 and 1 in turn. When push button 4 is pushed down, the resistance 4 (not shown), belonging to the circuit 20, is connected. At the same time circuit 4—4'—4''—4 is disconnected. For the same reason as mentioned before, the electronic ray is thereby directed to the collector connected with circuit 21, whereafter $R_{14}$ and $R_{19}$ are operated. $R_{14}$ is polarised and operates upwards and connects circuit 22, whereby the before-mentioned storing relay connected to contact 5–$R_{11}$ (not shown) is operated in a known manner. At the same time circuit 8 is disconnected and $R_4$ drops and forms circuit 23. $R_{18}$ operates. When push button 4 is released, circuit 20 is disconnected, whereafter circuit 4—4′—4″—4 is restored. The electronic ray is directed into starting position as described before and forms circuit 8. $R_4$ operates and forms circuit 24. $R_{17}$ operates and $R_{18}$ is held. Circuit 23 is disconnected and $R_{11}$ drops. The circuit 18 for the buzzing tone is disconnected.

When push button 1 is operated, the accompanying resistance $r_1$ (not shown) is connected with circuit 20—20′—20 at the time the circuit 4—4′—4″—4 is disconnected. In a manner analogous to what has been described before, the electronic ray is thereby directed to the collector connected with circuit 25, at which $R_{12}$ and $R_{19}$ are operated. $R_{12}$ is polarised and operates downwards and connects circuit 26, whereby the before-mentioned storing relay connected with contact 10–$R_{17}$ is operated in a known manner. At the same time circuit 8 is disconnected and $R_4$ drops and forms circuit 27 which holds $R_{17}$. When push button 1 is released, circuit 20—20′—20 is disconnected, whereafter circuit 4—4′—4″—4 is restored. The electronic ray is directed to the starting position in the manner before described and forms circuit 8. $R_4$ is operated and circuit 24 restored.

The subscriber, having in this way transmitted the number 41, these numerals are stored in the storing device (not shown) in the described manner.

If an error arises in the indicating device KS or in the devices connected with its operation, a trouble alarm is given according to the sequence of functions described in the following. It is evident from the above, that the electronic ray in normal cases is directed to circuit 14 when the resistances $rp_1$ and $rp_2$ are connected in series with the subscriber's line. If by any error the circuit 14 is not connected, $R_8$ is not operated nor is $R_9$. $R_7$ however, disconnects circuit 11 to $R_6$ in a normal way, whereby $R_6$ drops with delayed action. When $R_6$ drops, circuit 44 is formed whereby $R_{10}$ is operated and is held via circuit 45. $R_{10}$ is sending an alarm over circuit 46 and disconnects circuit 6 whereby $R_{20}$ drops and the resistance-responsive device is disconnected in this way.

We have shown what we believe to be the best embodiment of our invention. We do not wish, however, to be confined to the embodiment shown, but what we desire to secure by Letters Patent is the invention as defined in the appended claims.

We claim:

1. A switching device adapted to control machine switching apparatus and to respond selectively to each of a plurality of standard resistors in a telephone subscriber's set, said subscriber's set further comprising switching means for selectively and individually bridging said resistors across a telephone line, comprising: a variable resistor; a testing circuit including said line, said subscriber set and said variable resistor; means connectable to said line and controllable by said subscriber set for varying said variable resistor to equalize said testing circuit to a fixed predetermined value of resistance; resistance responsive means connected to said testing circuit and selectively responsive, after said equalization of said testing circuit, to connection of any one of said standard resistors to said telephone line; and circuit means comprising contacts selectively controlled by said resistance responsive device.

2. A switching device according to claim 1, further comprising: a transmitter in said subscriber's set; and rectifier means connected to said transmitter for excluding said transmitter from said testing circuit.

3. A switching device according to claim 2, wherein said rectifier means comprises a rectifier connected in parallel with said transmitter.

4. A switching device according to claim 2, wherein said rectifier means comprises a rectifier connected in series with said transmitter.

5. A switching device according to claim 1, wherein said resistance-responsive device comprises means including an electron beam, a plurality of targets to which said beam may be deflected, and means connected to said test circuit and disposed to deflect said beam.

6. A switching device according to claim 5, wherein said circuit means comprises a plurality of relays having windings, said relays having contacts controllable by energization of said windings, said windings being connected to said targets.

7. A switching device adapted to control machine switching apparatus and to respond selectively to each of a plurality of standard resistors in a telephone subscriber's set, said subscriber's set further comprising switching means for selectively and individually bridging said resistors across a telephone line, comprising: a potential-responsive device comprising an electron beam, a plurality of targets, and means for deflecting said beam for selectively establishing a plurality of circuits, each circuit including a particular one of said targets; a variable resistor; a test circuit including said variable resistor, said subscriber's set and said line; a selector switch connected to vary the value of said resistor; means for connecting said switch to said line and initiating operation thereof; means responsive to said potential responsive device for stopping operation of said selector switch upon equalizing the resistance of said test circuit to a fixed predetermined value determined by establishing a circuit including one of said targets, said electron beam thereafter being selectively deflectable to others of said targets by operation of said switching means of said subscriber's set; and circuit means connected to said others of said targets and comprising contacts selectively controlled thereby.

8. A switching device according to claim 7, wherein said circuit means comprises a plurality of relays having windings, said relays having contacts controllable by energization of said windings, said windings being connected to said others of said targets.

9. A switching device adapted to control machine switching apparatus and to respond selectively to each of a plurality of standard resistors in a telephone subscriber's set, said subscriber's set further comprising switching means for selectively and individually bridging said resistors across a telephone line, comprising: a potential-responsive device comprising an electron beam, a plurality of targets arranged in a row, and means for deflecting said beam for selectively establishing a plurality of circuits, each circuit including a particular one of said targets; a variable resistor; a test circuit including said variable resistor, said subscriber's set and said line; a selector switch connected to vary the value of said resistor; means for connecting said switch to said line and initiating operation thereof; means responsive to said potential responsive device for stopping operation of said selector switch upon equalizing the resistance of said test circuit to a fixed predetermined value determined by establishing a first circuit including one of said targets at one end of said row; means operative in response to establishment of said first circuit and disposed to vary the resistance of said test circuit to establish a second circuit including a target at the opposite end of said row; means responsive to said second circuit connected to restore said test circuit to its original fixed predetermined value; means responsive to said restoration for transmitting dial tone to said line, said electron beam thereafter being selectively defectable to others of said targets intermediate said end targets by operation of said switching means of said subscriber's set; and circuit means connected to said others of said targets and comprising contacts selectively controlled thereby.

10. A switching device according to claim 9, wherein said circuit means comprises a plurality of relays having windings, said relays having contacts controllable by energization of said windings, said windings being connected to said others of said targets.

11. A switching device according to claim 9 further comprising an alarm circuit including timing means, said alarm circuit being adapted to cause operation of a trouble signal and being connected for response to said first and said second circuits and being operative after a time interval exceeding a value determined by said timing means between the establishment of said first circuit and establishment of said second circuit to cause operation of said trouble signal.

STEN DANIEL VIGREN.
HARRY FREESE.
PER HARRY ELIAS CLAESSON.
STIG PER ROBERT ÅKESSON.

REFERENCES CITED

The following references are of record in the file of this patent:

UNITED STATES PATENTS

| Number | Name | Date |
|---|---|---|
| 1,337,715 | McQuarrie | Apr. 20, 1920 |
| 1,757,446 | Wright | May 6, 1930 |
| 1,870,621 | Gardner | Aug. 9, 1932 |
| 1,886,216 | Nilson | Nov. 1, 1932 |
| 1,964,526 | Melsheimer | June 26, 1934 |
| 2,164,335 | Mathes | July 4, 1939 |
| 2,183,030 | Richards | Dec. 12, 1939 |
| 2,308,637 | Babcock | Jan. 19, 1943 |
| 2,317,191 | Holbrook | Apr. 20, 1943 |
| 2,332,912 | Hecht | Oct. 26, 1943 |
| 2,379,715 | Hubbard | July 3, 1945 |
| 2,387,018 | Hartley | Oct. 16, 1945 |